United States Patent
Kim et al.

(10) Patent No.: US 10,315,501 B2
(45) Date of Patent: Jun. 11, 2019

(54) APPARATUS AND METHOD FOR STARTING ENGINE OF MILD HYBRID ELECTRIC VEHICLE

(71) Applicants: Hyundai Motor Company, Seoul (KR); Kia Motors Corporation, Seoul (KR)

(72) Inventors: YoungMin Kim, Yongin-si (KR); Hwa Yong Jang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/807,376

(22) Filed: Nov. 8, 2017

(65) Prior Publication Data

US 2018/0134138 A1 May 17, 2018

(30) Foreign Application Priority Data

Nov. 17, 2016 (KR) .................. 10-2016-0153504

(51) Int. Cl.
| | |
|---|---|
| B60K 6/26 | (2007.10) |
| B60K 6/485 | (2007.10) |
| F02N 11/00 | (2006.01) |
| F02N 19/00 | (2010.01) |
| F02D 35/02 | (2006.01) |
| B60W 10/06 | (2006.01) |

(Continued)

(52) U.S. Cl.
CPC ............. B60K 6/26 (2013.01); B60K 6/485 (2013.01); F02D 35/028 (2013.01); F02N 11/00 (2013.01); F02N 19/005 (2013.01); B60K 2006/268 (2013.01); B60W 10/06 (2013.01); B60W 10/08 (2013.01); B60W 20/00 (2013.01); B60W 30/192 (2013.01); F02N 11/04 (2013.01); F02N 2200/021 (2013.01); F02P 7/067 (2013.01); Y02T 10/6226 (2013.01)

(58) Field of Classification Search
CPC .... F02D 35/028; F02D 41/0092; F02N 11/04; E02F 3/60
See application file for complete search history.

(56) References Cited

U.S. PATENT DOCUMENTS

| | | | | |
|---|---|---|---|---|
| 4,762,106 A | * | 8/1988 | Blauhut | ............... F02P 5/1455 123/406.42 |
| 8,882,634 B2 | * | 11/2014 | Banker | ............... B60W 10/196 477/5 |

FOREIGN PATENT DOCUMENTS

| | | |
|---|---|---|
| JP | 2005-351211 A | 12/2005 |
| JP | 2009-018695 A | 1/2009 |

(Continued)

*Primary Examiner* — Bryan A Evans
(74) *Attorney, Agent, or Firm* — Morgan, Lewis & Bockius LLP (57) ABSTRACT

An apparatus for starting an engine of a mild hybrid electric vehicle may include: an ignition switch including a plurality of contact points; a mild hybrid starter & generator (MHSG) including a stator and a rotor internally disposed within the stator, and starting the engine or generating electricity according to an output of the engine; an MHSG wheel rotating integrally with the rotor, and having at least three teeth on a circumference thereof; an MHSG position detector configured for detecting positions of the teeth; and a controller configured for determining a top dead center (TDC) of a predetermined cylinder according to a signal of the MHSG position detector, and rotating the MHSG to start the engine.

10 Claims, 6 Drawing Sheets

(51) Int. Cl.
*B60W 10/08* (2006.01)
*B60W 20/00* (2016.01)
*B60W 30/192* (2012.01)
*F02N 11/04* (2006.01)
*F02P 7/067* (2006.01)

(56) References Cited

FOREIGN PATENT DOCUMENTS

| | | |
|---|---|---|
| JP | 4655992 B2 | 3/2011 |
| JP | 2011-085026 A | 4/2011 |
| JP | 2013-102667 A | 5/2013 |
| JP | 2014-137003 A | 7/2014 |
| KR | 10-2009-0062389 A | 6/2009 |
| KR | 10-1047636 B1 | 7/2011 |
| KR | 10-2014-0144666 A | 12/2014 |

\* cited by examiner

APPARATUS AND METHOD FOR STARTING ENGINE OF MILD HYBRID ELECTRIC VEHICLE

CROSS-REFERENCE(S) TO RELATED APPLICATIONS

The present application claims priority to Korean Patent Application No. 10-2016-0153504, filed on Nov. 17, 2016, the entire contents of which is incorporated herein for all purposes by this reference.

BACKGROUND OF THE INVENTION

Field of the Invention

The present invention relates to an apparatus and a method for starting an engine of mild hybrid electric vehicle, and, more particularly, to an apparatus and a method for starting an engine of a mild hybrid electric vehicle utilizing a mild hybrid starter & generator.

Description of Related Art

A hybrid electric vehicle employs an internal combustion engine and a battery power source in combination. The hybrid electric vehicle efficiently combines a torque of the internal combustion engine and a torque of a motor.

Hybrid electric vehicles may be divided into a hard type and a mild type according to a power sharing ratio between the engine and the motor. In the case of the mild type of hybrid electric vehicle (hereinafter referred to as a mild hybrid electric vehicle), a mild hybrid starter & generator (MHSG), configured to start the engine or generate electricity according to an output of the engine, is utilized instead of an alternator. In the case of the hard type of hybrid electric vehicle, a driving motor configured for generating a driving torque is used in addition to an integrated starter & generator (ISG) which is configured to start the engine or generate electricity.

The MHSG may assist the torque of the engine according to a plurality of running states of the vehicle and may charge a battery (e.g., a 48 V battery) through regenerative braking device. Accordingly, a fuel efficiency of the mild hybrid electric vehicle may be improved.

In the case of the 4-cylindered engine, a camshaft position sensor is used to detect top dead center (TDC) of a No. 1 cylinder, and an engine control unit (ECU) may determine a specific cylinder to which a fuel is going to be injected based on a signal of the camshaft position sensor. In addition, a crankshaft position sensor is used to detect a rotation speed of the engine, and the ECU may determine a fuel injection timing based on a signal of the crankshaft position sensor. In a case that the camshaft position sensor or the crankshaft position sensor malfunctions, the engine may be turned off and restarting of the engine may be unavailable.

Accordingly, even though the camshaft position sensor or the crankshaft position sensor malfunctions, a method of facilitating operation and restart of the engine is requested.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and a method for starting an engine having an advantage of starting the engine using an MHSG wheel having a plurality of teeth on a circumference thereof.

An apparatus for starting an engine according to an exemplary embodiment of the present invention may include: an ignition switch including a plurality of contact points; a mild hybrid starter & generator (MHSG) including a stator and a rotor internally disposed within the stator, and starting the engine or generating electricity according to an output of the engine; an MHSG wheel rotating integrally with the rotor, and having at least three teeth on a circumference thereof; an MHSG position detector detecting a plurality of positions of the teeth; and a controller configured to determine a top dead center (TDC) of a predetermined cylinder according to a signal of the MHSG position detector and rotating the MHSG to start the engine.

A size and interval of the at least three teeth may be different from each other.

The at least three teeth may include a first tooth, a second tooth, and a third tooth. A distance between a positive flank and a negative flank of the first tooth, a distance between a positive flank and a negative flank of the second tooth, and a distance between a positive flank and a negative flank of the third tooth may be different from each other, and a distance between the negative flank of the first tooth and the positive flank of the second tooth, a distance between the negative flank of the second tooth and the positive flank of the third tooth, and a distance between the negative flank of the third tooth and the positive flank of the first tooth may be difference from each other.

When a camshaft position detector is in a defective state, the controller may be configured to control an operation of the engine using the MHSG position detector.

When a crankshaft position detector is in a defective state, the controller may be configured to control the operation of the engine using the MHSG position detector.

When an OFF contact point is selected, the controller may be configured to rotate the MHSG wherein a position of a camshaft of the engine becomes a predetermined position.

A hole may be formed at a center of the MHSG wheel, and a rotation shaft of the rotor may penetrate the hole.

A method for starting an engine using an apparatus includes an ignition switch including a plurality of contact points; a mild hybrid starter & generator (MHSG) including a stator and a rotor internally disposed within the stator, and starting the engine or generating electricity according to an output of the engine; an MHSG wheel rotating integrally with the rotor, and having at least three teeth on a circumference thereof; an MHSG position detector configured to detect positions of the teeth; and a controller configured to determine a top dead center (TDC) of a predetermined cylinder according to a signal of the MHSG position detector, and rotating the MHSG to start the engine according to an exemplary embodiment of the present invention may include: determining whether a camshaft position detector is in a defective state; and controlling an operation of the engine according to a plurality of signals of a crankshaft position detector and the MHSG position detector when the camshaft position detector is in the defective state.

The method may further include: determining whether the crankshaft position detector is in a defective state; and controlling an operation of the engine according to a plurality of signals of the camshaft position detector and the MHSG position detector when the crankshaft position detector is in the defective state.

The method further includes determining whether an OFF contact point of the ignition switch is selected; and rotating the MHSG wherein a position of a camshaft of the engine becomes a predetermined position when the OFF contact point of the ignition switch is selected.

According to an exemplary embodiment of the present invention, even though the camshaft position detector or the crankshaft position detector is in the defective state, the engine may be started without a delay time.

The methods and apparatuses of the present invention have other features and advantages which will be apparent from or are set forth in more detail in the accompanying drawings, which are incorporated herein, and the following Detailed Description, which together server to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents, and other embodiments, which may be included within the spirit and scope of the invention as defined by the appended claims.

Elements which are not related with the description are omitted for clearly describing the exemplary embodiments of the present invention.

Since each component in the drawings is arbitrarily illustrated for ease of description, the present invention is not particularly limited to the components illustrated in the drawings.

Figure 1:
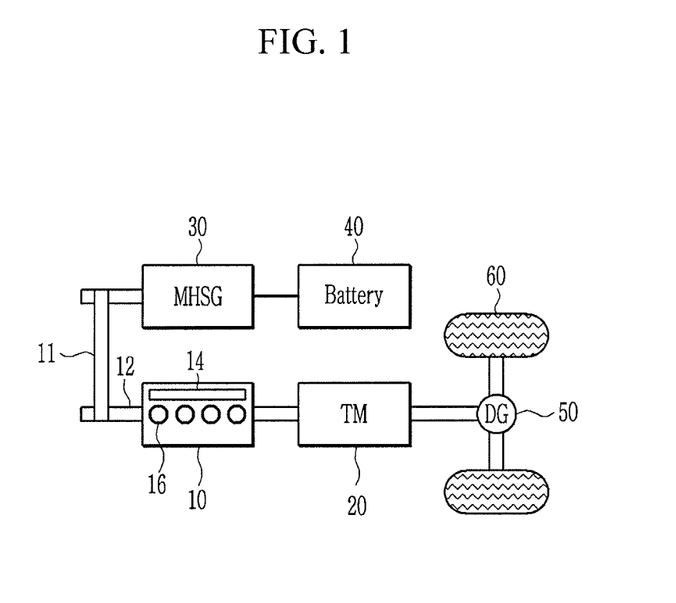
FIG. 1 is a block diagram of a mild hybrid electric vehicle according to an exemplary embodiment of the present invention.

FIG. 1 is a block diagram of a mild hybrid electric vehicle according to an exemplary embodiment of the present invention.

As shown in FIG. 1, the mild hybrid electric vehicle according to an exemplary embodiment of the present invention may include an engine 10, a transmission 20, a mild hybrid starter & generator (MHSG) 30, a battery 40, a differential gear apparatus 50, and wheels 60.

The engine 10 combusts fuel and air to generate a torque, and a plurality of engines including a gasoline engine, a diesel engine, and a liquefied petroleum injection (LPI) engine may be used as the engine 10.

In connection with a torque transmission of the mild hybrid electric vehicle, the torque generated from the engine 10 is transmitted to an input shaft of the transmission 20, and the torque output from an output shaft of the transmission 20 is transmitted to an axle via the differential gear apparatus 50. The axle rotates the wheels 60 wherein the mild hybrid electric vehicle drives by the torque generated from the engine 10.

The transmission 20 may be an automatic transmission or a manual transmission. The automatic transmission controls a hydraulic pressure by operating a plurality of solenoid valves according to a speed of the mild hybrid electric vehicle and a position of an accelerator pedal, wherein a shift gear of a target gear stage is operated and shifting of the gears is automatically performed. In a case of the manual transmission, shifting is performed as a driver actuates a clutch pedal and moves a gear lever to a desired gear stage.

The MHSG 30 is configured to convert electrical energy into mechanical energy or converts mechanical energy into electrical energy. In other words, the MHSG 30 starts the engine 10 or generates electricity according to an output of the engine 10. In addition, the MHSG 30 may assist the torque of the engine 10. The mild hybrid electric vehicle may be used as a main torque, and the torque of the MHSG 30 may be used as an auxiliary torque. The engine 10 and the MHSG 30 may be connected to each other through a belt 11.

The battery 40 may supply electricity to the MHSG 30, and may be charged through the electricity recovered by the MHSG 30. The battery 40 is a high voltage battery (e.g., 48 V battery), and may be a lithium-ion battery. The mild hybrid electric vehicle may further include a low voltage battery DC-DC converter (LDC) configured to convert a voltage supplied from the battery 40 into a low voltage, and a low voltage battery (e.g., 12 V battery) configured to supply a low voltage to a plurality of electrical loads (e.g., a headlamp and an air conditioner).

Figure 2:
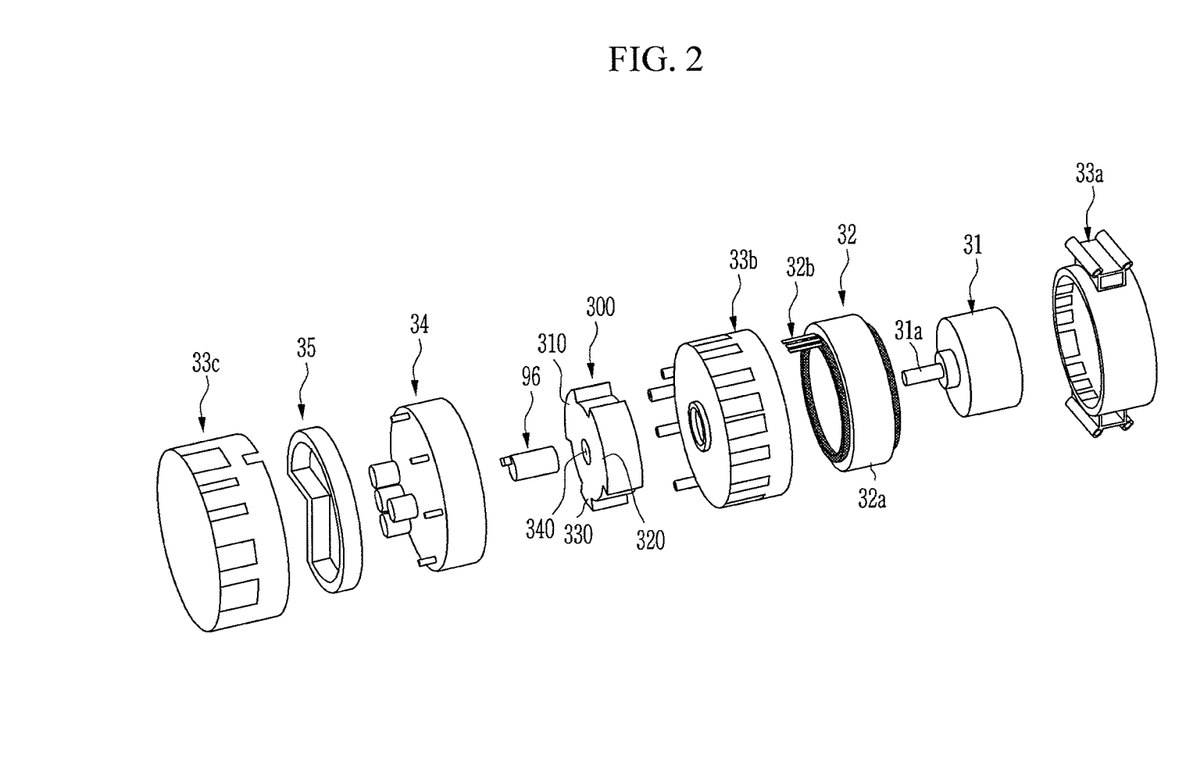
FIG. 2 is an exploded perspective view of an MHSG according to an exemplary embodiment of the present invention.
Figure 3:
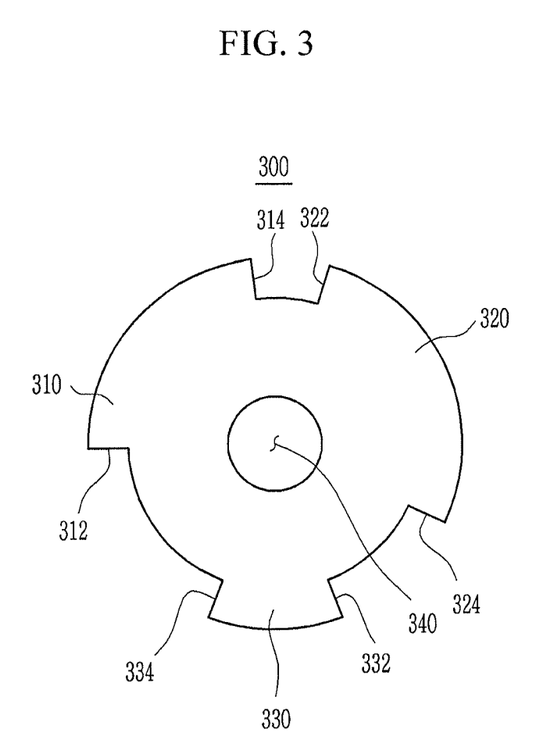
FIG. 3 is a cross-sectional view of an MHSG wheel according to an exemplary embodiment of the present invention.

FIG. 2 is an exploded perspective view of an MHSG according to an exemplary embodiment of the present invention, and FIG. 3 is a cross-sectional view of an MHSG wheel according to an exemplary embodiment of the present invention.

Referring to FIG. 2 and FIG. 3, an MHSG 30 according to an exemplary embodiment of the present invention may include a rotor 31, a stator 32, a first case 33a, a second case 33b, a third case 33c, a power module 34, a control module 35, an MHSG wheel 300, and an MHSG position detector 96.

A rotation shaft 31a is coupled to a center of the rotor 31, and the rotor 31 is internally disposed within the stator 32 wherein an external circumference of the rotor 31 is separated from an internal circumference of the stator 32 by a predetermined interval. The rotor 31 is internally disposed and rotatable within the stator 32.

The stator 32 includes a stator core 32a including an electric steel plate and a coil 32b wound around the stator core 32a. The coil 32b is electrically connected to the power module 34 to receive a current from the power module 34. When the current is applied to the coil 32b from the power module 34, the rotor 31 rotates according to a magnetic flux, and the MHSG 30 generates the torque.

The first case 33a and the second case 33b are formed to surround the rotor 31 and the stator 32. The stator 32 may be internally fixed within the second case 33b.

The second case 33b and the third case 33c are formed to surround the power module 34 and the control module 35. The power module 34 and the control module 35 may be internally fixed within the third case 33c.

The power module 34 applies a current to the coil 32b of the stator 32 according to a control signal of the control module 35.

Figure 4A:
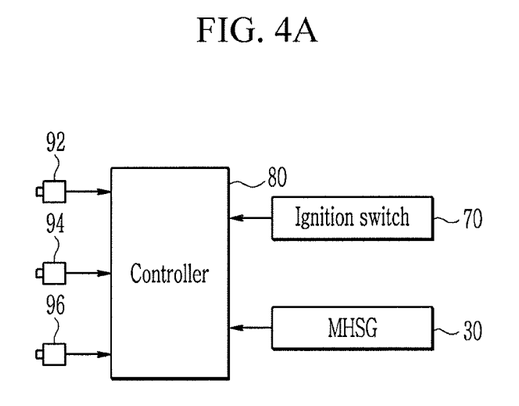
FIG. 4A and FIG. 4B are views illustrating an apparatus for starting an engine of a mild hybrid electric vehicle according to an exemplary embodiment of the present invention.

The control module 35 is configured to control an operation of the power module 34 according to a control signal of a controller 80 (refer to FIG. 4), and is configured to control the current applied to the coil 32b of the stator 32. In addition, the control module 35 is configured to receive a signal of the MHSG position detector 96 and transmits a corresponding signal to the controller 80.

The MHSG wheel 300 rotates integrally with the rotor 31. A hole 340 is formed at the center of the MHSG wheel 300, and the rotation shaft 31a of the rotor 31 may be fixed to penetrate the hole 340. At least three teeth 310, 320, and 330 are formed on a circumference of the MHSG wheel 300. A size and intervals of the plurality of teeth 310, 320, and 330 may be different from each other.

Each of the at least three teeth 310, 320, and 330 includes a positive flank and a negative flank. Herein, the positive flank is a portion where a tooth starts along a rotational direction of the MHSG wheel 300, and the negative flank is a portion where a tooth end portions along the rotational directions of the MHSG wheel 300.

Referring to FIG. 4, a distance b' between a positive flank 312 and a negative flank 314 of the first tooth 310, a distance d' between a positive flank 322 and a negative flank 324 of the second tooth 320, and a distance f between a positive flank 332 and a negative flank 334 of the third tooth 330 may be different from each other. In addition, a distance c' between the negative flank 314 of the first tooth 310 and the positive flank 322 of the second tooth 320, a distance e' between the negative flank 324 of the second tooth 320 and the positive flank 332 of the third tooth 330, and a distance a' between the negative flank 334 of the third tooth 330 and the positive flank 312 of the first tooth 310 may be different from each other.

The MHSG position detector 96 is configured to detect the positions of the at least three teeth 310, 320, and 330 (i.e., a position of the MHSG wheel 300), and transmits a corresponding signal to the control module 35. The MHSG position detector 96 may be fixedly disposed at the power module 34.

FIG. 4 is a view illustrating an apparatus for starting an engine of a mild hybrid electric vehicle according to an exemplary embodiment of the present invention.

As shown in FIG. 4, an apparatus for starting an engine of a mild hybrid electric vehicle according to an exemplary embodiment of the present invention includes an ignition switch 70, the MHSG wheel 300, the MHSG position detector 96, the controller 80, and the MHSG 30.

The ignition switch 70 includes a plurality of contact points. The plurality of contact points includes an OFF contact point, an ACC contact point, an ON contact point, and a START contact point. When the OFF contact point is selected, the engine 10 is shut off. When the ACC contact point is selected, accessory devices including a radio may be used. When the ON contact point is selected, electronic devices using a voltage of the battery 40 may be used. When the START contact point is selected, the engine 10 is started. Contact points of the ignition switch 70 may be selected by a starting key or starting button.

A crankshaft wheel 100 is mounted to a crankshaft 12 of the engine 10 wherein the crankshaft wheel 100 integrally rotates with the crankshaft 12, and a plurality of teeth 110 are formed on a circumference of the crankshaft wheel 100. A size and interval of the plurality of teeth 110 are the same, and a guide groove 115 is formed on a portion of the crankshaft wheel 100 to detect a reference position of the crankshaft 12.

A crankshaft position detector 92 is configured to detect a plurality of positions of the plurality of teeth 110 (i.e., a position of the crankshaft 12), and transmits a corresponding signal to the controller 80. The controller 80 may be configured to determine a rotation speed of the engine 10 according to the signal of the crankshaft position detector 92.

A camshaft wheel 200 is mounted to a camshaft 14 of the engine 10 wherein the camshaft wheel 200 integrally rotates with the camshaft 14, and a plurality of teeth 210, 220, and 230 with non-uniform intervals are formed on a circumference of the camshaft wheel 200. A size and interval of the plurality of teeth 210, 220, and 230 may be different from each other.

A camshaft position detector 94 is configured to detect a plurality of positions of the teeth 210, 220, and 230 (i.e., a position of the camshaft 14), and transmits a corresponding signal to the controller 80. The controller 80 may be configured to detect the top dead center (TDC) of a predetermined cylinder 16 according to the signal of the camshaft position detector 94. In a case of a four-cylinder engine, the predetermined cylinder 16 may be a No. 1 cylinder, and the camshaft 14 may rotate once when the crankshaft 12 rotates twice.

Figure 4B:
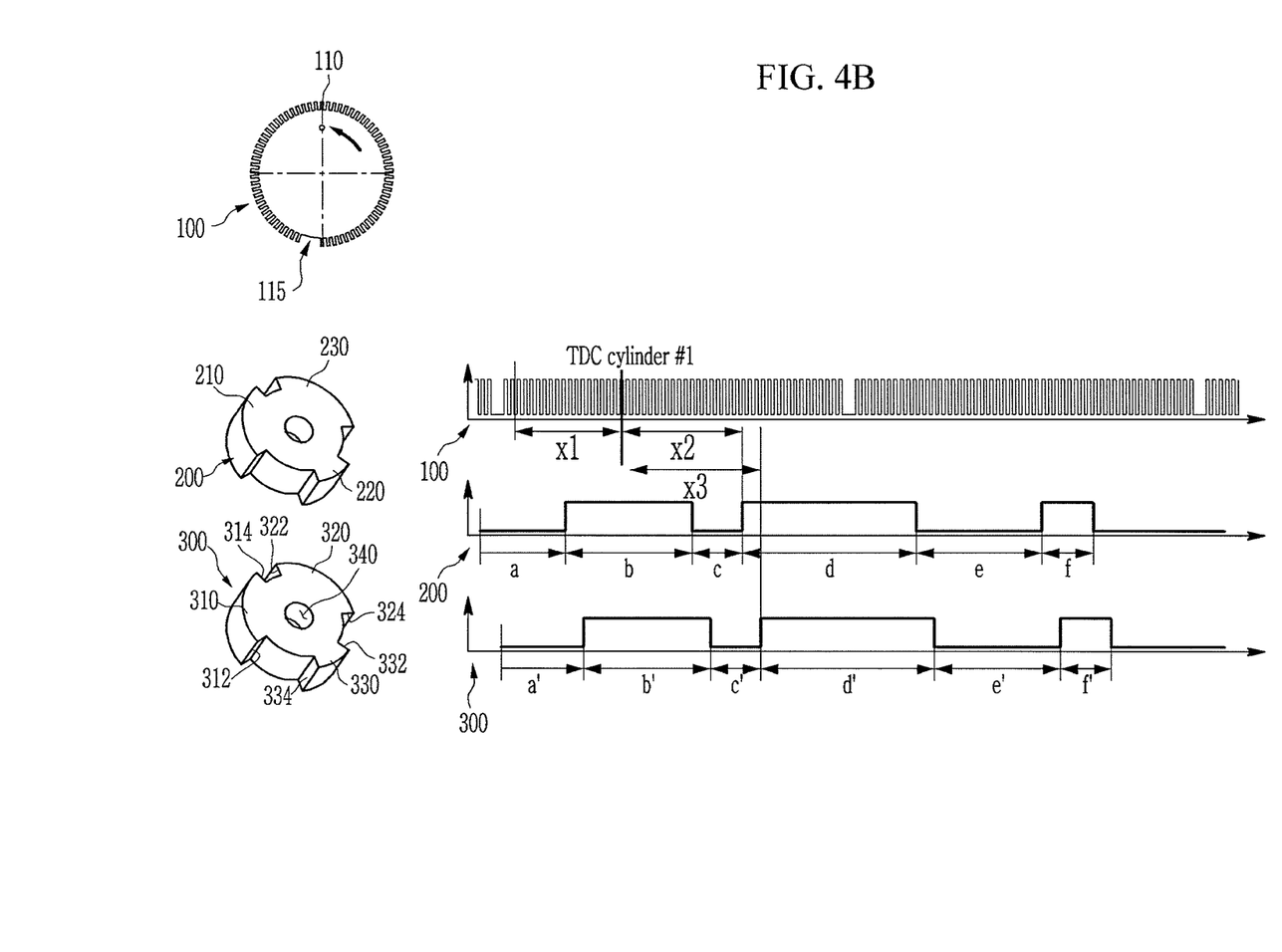

The MHSG wheel 300 is mounted to the MHSG 30 wherein the MHSG wheel 300 integrally rotates with the MHSG 30, and at least three teeth 310, 320, and 330 are formed on the circumference of the MHSG 30. A size and interval of the at least three teeth 310, 320, and 330 may be different from each other. In addition, the intervals of the teeth 310, 320 and 330 of the MHSG wheel 300 are the same as those of the teeth 210, 220, and 230 of the camshaft wheel 200 with a predetermined angle difference (x3−x2).

The MHSG position detector 96 is configured to detect the positions of the at least three teeth 310, 320, and 330 (i.e., a position of the MHSG wheel 300), and transmits a corresponding signal to the control module 35. The control module 35 is configured to transmit the signal to the controller 80. The controller 80 may be configured to detect the top dead center (TDC) of the predetermined cylinder 16 according to the signal of the MHSG position detector 96.

The controller 80 may be configured to control an operation of the MHSG 30 according to the signals of the crankshaft position detector 92, the camshaft position detector 94, and the MHSG position detector 96.

The controller 80 may be implemented with one or more processors executed by a predetermined program, and the predetermined program includes a series of commands for performing each step included in a method for starting an engine of a mild hybrid electric vehicle according to an exemplary embodiment of the present invention to be described below.

Hereinafter, a method for starting an engine of a mild hybrid electric vehicle according to an exemplary embodiment of the present invention will be described with reference to FIG. 2, FIG. 3, FIG. 4, and FIG. 5.

Figure 5:
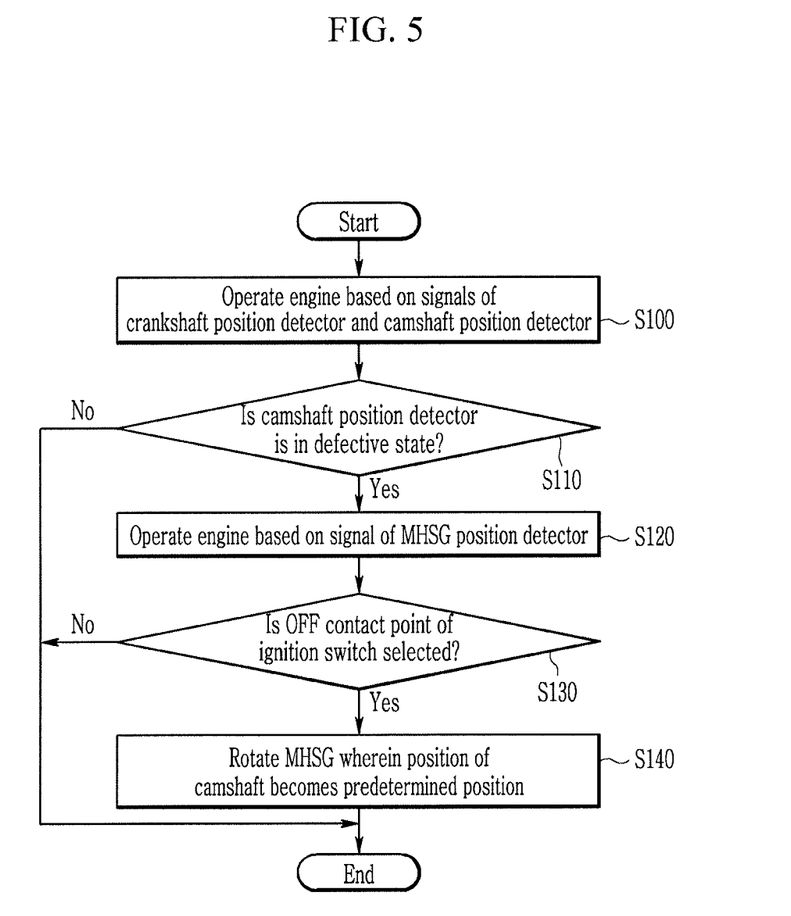
FIG. 5 is a flowchart illustrating a method for starting an engine of a mild hybrid electric vehicle according to an exemplary embodiment of the present invention.

FIG. 5 is a flowchart illustrating a method for starting an engine of a mild hybrid electric vehicle according to an exemplary embodiment of the present invention.

Referring to FIG. 2, FIG. 3, FIG. 4, and FIG. 5, the controller 80 is configured to control an operation of the engine 10 according to the signals of the crankshaft position detector 92 and the camshaft position detector 94 during operation of the mild hybrid electric vehicle (S100).

The controller 80 is configured to determine whether the camshaft position detector 94 is in a defective state (S110). The controller 80 may be configured to determine that the camshaft position detector 94 is in the defective state according to a disconnection of the signal of the camshaft position detector 94, abnormal behavior of the signal, and the like.

When the camshaft position detector 94 is in a normal state (S110), the controller 80 is configured to end the method for starting the engine of the mild hybrid electric vehicle according to an exemplary embodiment of the present invention. The controller 80 may be configured to control the operation of the engine 10 by determining a fuel injection timing and the like according to the signals of the crankshaft position detector 92 and the camshaft position detector 94.

When the controller 80 determines that the camshaft position detector 94 is in the defective state (S110), the controller 80 may be configured to control the operation of the engine 10 according to the signals of the crankshaft position detector 92 and the MHSG position detector 96 (S120). According to the related art, when the camshaft position detector 94 is in the defective state, the controller 80 cannot determine a cylinder to which the fuel is going to be injected, and thus the engine 10 may be shut off. However, according to an exemplary embodiment of the present invention, the controller 80 may be configured to determine the top dead center (TDC) of the predetermined cylinder 16 according to the signal of the MHSG position detector 96 and may control the operation of the engine 10.

The controller 80 is configured to determine whether the OFF contact point of the ignition switch 70 is selected (S130).

When the OFF contact point of the ignition switch 70 is not selected (S130), the controller 80 is configured to end the method for starting the engine according to an exemplary embodiment of the present invention. The controller 80 is configured to continuously control the operation of the engine 10 according to the signals of the crankshaft position detector 92 and the MHSG position detector 96

When the OFF contact point of the ignition switch 70 is selected (S130), the controller 80 is configured to rotate the MHSG 30 wherein the position of the crankshaft of the engine 10 becomes a predetermined position (S140). The predetermined position may be determined by a person of ordinary skill in the art in consideration of an efficiency of restarting and general combustion safety. When the position of the camshaft is the predetermined position when restarting the engine 10, the fuel injection may be initiated from a specific cylinder, starting the engine 10 without a delay time.

Meanwhile, the controller 80 may be configured to determine whether the crankshaft position detector 92 is in a defective state (S110). The controller 80 may be configured to determine that the crankshaft position detector 92 is in the defective state according to a disconnection of the signal of the crankshaft position detector 92, abnormal behavior of the signal, and the like. When the controller 80 determines that the crankshaft position detector 92 is in the defective state (S110), the controller 80 may be configured to control the operation of the engine 10 according to the signal of the camshaft position detector 94 and the MHSG position detector 96.

As described above, according to an exemplary embodiment of the present invention, even though the camshaft position detector 94 or the crankshaft position detector 92 is in the defective state, the engine 10 may be started without a delay time.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for starting an engine of a mild hybrid electric vehicle, the apparatus comprising:
   an ignition switch including a plurality of contact points;
   a mild hybrid starter & generator (MHSG) including a stator and a rotor internally disposed within the stator, and configured to start the engine or generate electricity according to an output of the engine;
   a MHSG wheel rotating integrally with the rotor, and having at least three teeth on a circumference of the MHSG wheel;
   a MHSG position detector detecting positions of the teeth; and
   a controller configured to determine a top dead center (TDC) of a predetermined cylinder according to a signal of the MHSG position detector, and to rotate the MHSG to start the engine.

2. The apparatus of claim 1, wherein a size and an interval of the at least three teeth are different from each other.

3. The apparatus of claim 1, wherein the at least three teeth include a first tooth, a second tooth, and a third tooth,
   a distance between a positive flank and a negative flank of the first tooth, a distance between a positive flank and a negative flank of the second tooth, and a distance between a positive flank and a negative flank of the third tooth are different from each other, and
   a distance between the negative flank of the first tooth and the positive flank of the second tooth, a distance between the negative flank of the second tooth and the positive flank of the third tooth, and a distance between the negative flank of the third tooth and the positive flank of the first tooth are difference from each other.

4. The apparatus of claim 1, wherein, when a camshaft position detector is in a defective state, the controller is configured to control an operation of the engine using the MHSG position detector.

5. The apparatus of claim 1, wherein, when a crankshaft position detector is in a defective state, the controller is configured to control an operation of the engine using the MHSG position detector.

6. The apparatus of claim 1, wherein the contact points include an OFF contact point and, wherein, when the OFF contact point is selected, the controller is configured to rotate the MHSG, such that a position of a camshaft of the engine becomes a predetermined position.

7. The apparatus of claim 1, wherein a hole is formed at a center of the MHSG wheel, and a rotation shaft of the rotor penetrates the hole.

8. A method for starting an engine using an apparatus having an ignition switch including a plurality of contact points; a mild hybrid starter & generator (MHSG) including a stator and a rotor internally disposed within the stator, and starting the engine or generating electricity according to an output of the engine; an MHSG wheel rotating integrally with the rotor, and having at least three teeth on a circumference thereof; an MHSG position detector configured to positions of the teeth; and a controller configured to determine a top dead center (TDC) of a predetermined cylinder according to a signal of the MHSG position detector, and rotating the MHSG to start the engine, the method comprising:
  determining whether a camshaft position detector is in a defective state; and
  controlling an operation of the engine according to signals of a crankshaft position detector and the MHSG position detector when the camshaft position detector is in the defective state.

9. The method of claim 8, further comprising:
  determining whether the crankshaft position detector is in a defective state; and
  controlling an operation of the engine according to signals of the camshaft position detector and the MHSG position detector when the crankshaft position detector is in the defective state.

10. The method of claim 8, further comprising:
  determining whether an OFF contact point of the ignition switch is selected, wherein the contact points include the OFF contact point; and
  rotating the MHSG such that a position of a camshaft of the engine becomes a predetermined position when the OFF contact point of the ignition switch is selected.

* * * * *